United States Patent
Abd Elkader et al.

(10) Patent No.: US 8,321,817 B2
(45) Date of Patent: *Nov. 27, 2012

(54) MODEL-BASED FILL

(75) Inventors: Shohdy Abd Elkader, Cairo (EG);
Craig M. Larsen, San Jose, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/723,619

(22) Filed: Mar. 12, 2010

(65) Prior Publication Data

US 2011/0307844 A1    Dec. 15, 2011

Related U.S. Application Data

(63) Continuation of application No. 12/709,454, filed on Feb. 19, 2010.

(60) Provisional application No. 61/153,643, filed on Feb. 19, 2009.

(51) Int. Cl.
*G06F 17/50*    (2006.01)

(52) U.S. Cl. ............... 716/52; 716/51; 716/54; 716/112
(58) Field of Classification Search .............. 716/51–52, 716/54, 112
See application file for complete search history.

(56) References Cited

U.S. PATENT DOCUMENTS

| | | | | |
|---|---|---|---|---|
| 5,923,563 | A * | 7/1999 | Lavin et al. ..................... | 716/54 |
| 7,509,622 | B2 * | 3/2009 | Sinha et al. ..................... | 716/50 |
| 7,935,638 | B2 * | 5/2011 | Culp et al. ..................... | 438/712 |
| 7,971,158 | B2 * | 6/2011 | Anderson et al. ............... | 716/54 |
| 2011/0307844 | A1 * | 12/2011 | Abd Elkader et al. .......... | 716/52 |

* cited by examiner

*Primary Examiner* — Naum Levin
(74) *Attorney, Agent, or Firm* — Banner & Witcoff, Ltd.

(57) ABSTRACT

Various aspects of this disclosure relate to increasing pattern density in a circuit layout design of a circuit layer so as to control the thickness of material in a manufactured integrated circuit. For example, a layer in circuit design may be divided into separate areas, and a target thickness range may be established for all of the tiles in the integrated circuit design. Each area may be analyzed to determine if it has a sufficient pattern density for a thickness estimation model to accurately estimate its expected material thickness upon manufacture. Each tile may be analyzed to determine if the expected thickness for that tile is within the target thickness range.

12 Claims, 4 Drawing Sheets

MODEL-BASED FILL

RELATED APPLICATIONS

This application claims priority under 35 U.S.C. §120 to U.S. patent application Ser. No. 12/709,454 entitled "Model-Based Fill," filed on Feb. 19, 2010, naming Shohdy Abd Elkader and Craig M. Larsen as inventors, which in turn claimed priority under 35 U.S.C. §119 to U.S. Provisional Patent Application No. 61/153,643 entitled "Model-Based Fill," filed on Feb. 19, 2009, naming Shohdy Abd Elkader and Craig M. Larsen as inventors, each of which applications is incorporated entirely herein by reference.

FIELD OF THE INVENTION

The present invention relates to various techniques and tools to assist in the design of circuits, such as integrated circuits. Various aspects of the present invention are particularly applicable to adjusting the pattern density of a material layer of an integrated circuit design, to control a thickness of the material in an integrated circuit manufactured from the integrated circuit design.

BACKGROUND OF THE INVENTION

Electronic circuits, such as integrated microcircuits, are used in a variety of products, from automobiles to microwaves to personal computers. Designing and fabricating microcircuit devices typically involves many steps, known as a "design flow." The particular steps of a design flow are highly dependent upon the type of microcircuit, its complexity, the design team, and the microcircuit fabricator or foundry that will manufacture the microcircuit. Software and hardware "tools" then verify the design at various stages of the design flow by running software simulators and/or hardware emulators, and errors in the design are corrected.

Several steps are common to all design flows. First, the specifications for the new microcircuit are described in terms of logical operations, typically using a hardware design language (HDL), such as VHDL. After the accuracy of the logical design is confirmed, the logical design is converted into device design data by synthesis software. The device design data, in the form of a schematic, represents the specific electronic devices, such as transistors, resistors, and capacitors, which will achieve the desired logical result and their interconnections. Preliminary timing estimates for portions of the circuit may also be made at this stage, using an assumed characteristic speed for each device. This schematic generally corresponds to the level of representation displayed in conventional circuit diagrams.

Once the relationships between circuit devices have been established, the design is again transformed into physical design data describing specific geometric elements. These geometric elements, often referred to as a "layout" design, define the shapes that will be created in various materials to form the specified circuit devices. Custom layout editors, such as Mentor Graphics' IC Station or Cadence's Virtuoso are commonly used for this task. Automated place and route tools also will frequently be used to define the physical layouts, especially of wires that will be used to interconnect the circuit devices. Each layer of the microcircuit will have a corresponding layer representation in the layout design, and the geometric shapes described in a layer representation will define the relative locations of the circuit elements that will make up the circuit device. For example, shapes in the layer representation of a metal layer will define the locations of the metal wires used to connect the circuit devices. Thus, the layout design data represents the patterns that will be written onto masks to fabricate the desired microcircuit using, for example, photolithographic processes.

Modern integrated circuits typically will be formed of multiple layers of material, such as metal, diffusion material, and polysilicon. During the manufacturing process, layers of material are formed on top of one another sequentially. After each layer is created, portions of the layer are removed to form structures. Together, the structures of material form the functional circuit devices, such as transistors, capacitors and resistors, which will make up the integrated circuit. Before a new layer is formed over the structures in an existing layer, however, the existing layer must be polished to ensure planarity. Polishing using any of various types of polishing processes sometimes will generically be referred to as "planarization."

One problem with conventional planarization methods is that different materials will have different densities, so softer materials will be polished more than harder materials. As a result, a layer's surface may become uneven, causing the next layer to be more uneven. In some situations, the uppermost layers of material may have a very irregular surface topography. Such irregular surface topographies may cause a variety of flaws in the circuit structures, such as holes, loss of contact, and other manufacturing defects.

To improve the planarity of a layer of material, the integrated circuit designer (or manufacturer) often will analyze a circuit layout design for empty regions in the layer. That is, the designer or manufacturer will review the density of the geometric elements representing the structures that will be formed in the layer (sometimes referred to as "pattern density"), to identify regions that are empty of these geometric elements. The designer or manufacturer will then modify the circuit layout design to fill these empty regions with data representing "dummy" or "fill" geometric elements. That is, the designer or manufacturer will increase the density of the geometric elements in the circuit layout design for the layer by adding geometric elements that will form non-functional structures. When the circuit is manufactured, these "fill" structures will be formed alongside the "functional" structures (i.e., the structures used to form functional circuit devices), so that the overall surface of the layer is relatively flat. This type of corrective technique will often be implemented using a software application for identifying and manipulating structures defined in a circuit layout design, such as the CALIBRE® verification and manufacturability software tools available from Mentor Graphics® Corporation of Wilsonville, Oreg.

While this corrective technique usually improves the planarity of layers in an integrated circuit, its implementation is often unpredictable. Many conventional fill addition processes add fill geometric elements to the integrated circuit design in order to bring the overall geometric element density up to a target value. While increasing the pattern density in a layer of the design typically will increase the corresponding thickness of the material in the manufactured integrated circuit, the amount of the increase can be very unpredictable. In addition to being dependent upon the density of the geometric elements in the integrated circuit design, the material thickness also is dependent upon the ratio of the perimeter length of the geometric elements to the area occupied by the geometric elements. Conventional fill techniques do not take into account this perimeter-to-area ratio for the geometric elements, making the selection of the fill density amount to be added to an integrated circuit design unpredictable.

Adding unnecessary fill structures may increase the capacitance of the material layer. If the designer or manufacturer inadvertently fills too much of the empty regions with fill geometric elements, or places fill geometric elements too close to functional geometric elements, the increased capacitance in the manufactured material layer may cause the surrounding circuit devices to exceed their minimum timing requirements. Still further, each additional fill geometric element in a design may increase the time and complexity of optical proximity correction processing or resolution enhancement technology processing of the circuit layout design prior to manufacture.

BRIEF SUMMARY OF THE INVENTION

Advantageously, various examples of the invention provide techniques for increasing the pattern density in a circuit layout design of a circuit layer so as to control the thickness of the corresponding material in the manufactured integrated circuit. According to various implementations of the invention, a layer in circuit design is divided into separate areas, sometimes referred to as "windows" or "tiles." Each of the windows is analyzed to identify the tile with the highest functional density, which inherently determines the largest minimum tile thickness. The estimated thickness of this tile is then selected as a base thickness, and, based upon an allowable thickness variation (which may be determined by a designer or manufacturer), a target thickness range is established for all of the tiles in the integrated circuit design.

Initially, each tile may be analyzed to determine if it has a sufficient pattern density for a thickness estimation model to accurately estimate its expected material thickness upon manufacture. With some implementations of the invention, if a tile's pattern density is too small for its expected thickness to be accurately estimated, then that tile is ignored. With still other implementations of the invention, however, fill geometric elements may be added to the tile, in order to increase its pattern density up to a level that the thickness estimation model can use to accurately estimate the corresponding material thickness for that tile upon manufacture.

Next, each tile is analyzed to determine of the expected thickness for that tile is within the target thickness range. With some implementations of the invention, this analysis may be performed by employing the thickness estimation model directly. With still other implementations of the invention, however, the expected thickness of each tile can be estimated using a look up table generated using the thickness estimation model. More particularly, various embodiments of the invention may employ the thickness estimation model to generate a table of expected thickness values corresponding to combinations of geometric element density values and geometric element perimeter-to-area ratio values (or other values correlating to geometric element density values and/or geometric element perimeter-to-area ratio values). If the estimated thickness of a tile is outside of the target thickness range, then the tile is slated for further processing.

If a tile must be processed further, then the thickness estimation model is used to identify a geometric element density value (or correlating value) and a geometric element perimeter-to-area ratio value (or correlating value) combination for the tile that will provide an expected thickness within the target thickness range. With some implementations of the invention, these values can be calculated directly using the thickness estimation model. As previously noted, however, some implementations of the invention may employ a lookup table of expected thickness values corresponding to combinations of geometric element density values and geometric element perimeter-to-area ratio values (or other values correlating to geometric element density values and/or geometric element perimeter-to-area ratio values). By using this lookup table, the entries of the table can be scanned until an entry is identified reflecting a geometric element density value greater than the current geometric element density value of the tile, a geometric element perimeter-to-area ratio value greater than the current geometric element perimeter-to-area ratio value of the tile, and an expected thickness within the target thickness range.

Once a satisfactory combination of a geometric element density value (or correlating value), a geometric element perimeter-to-area ratio value (or correlating value) and a thickness value has been selected, then a shape for fill geometric elements is chosen from a plurality of fill shape options. Next, the amount of geometric elements with the chosen fill shape required to increase the geometric element density value (or correlating value) of the tile to the selected geometric element density value (or correlating value) is determined. Also, the geometric element perimeter-to-area ratio value (or correlating value) that would result from adding this amount of geometric elements with the chosen fill shape to the tile is determined. These two values can then be employed, either by using the lookup table or the thickness estimation model directly, to estimate an expected thickness of the tile upon addition of the amount of geometric elements with the chosen fill shape.

If the estimated expected thickness of the tile is within the target thickness range, then that amount of fill geometric elements with the chosen fill shape is added to the tile. The fill geometric elements can be added to the integrated circuit design using any conventional fill addition tool, such as the SmartFill tool included in the CALIBRE® family of integrated circuit design verification tools available from Mentor Graphics Corporation of Wilsonville, Oreg. If the estimated expected thickness of the tile is not within the target thickness range, however, then a new fill shape is selected, a new amount of fill geometric elements with the new shape to be added to the tile is determined, and the new geometric element perimeter-to-area ratio value (or correlating value) for this amount of fill geometric elements is determined. This process is repeated until a fill shape is chosen that provides an expected thickness for the tile within the target thickness range. If the choice of fill shapes is exhausted before a satisfactory expected thickness is obtained, then a new geometric element density value (or correlating value) and geometric element perimeter-to-area ratio value (or correlating value) for the tile is selected. Again, the new combination of values can be determined using the thickness estimation model, or by using a lookup table generated from the thickness estimation model.

DETAILED DESCRIPTION OF THE INVENTION

Illustrative Operating Environment

Various examples of fill geometric element addition methods and tools according to embodiments of the invention may be implemented by one or more programmable computing devices executing computer-executable software instructions. Alternately or additionally, various examples of fill geometric element addition methods and tools according to embodiments of the invention may be implemented by computer-executable software instructions stored in a computer-readable medium, such as a magnetic or optical storage device, or a solid state memory device. Because these examples of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or slave computers therefore will be described with reference to FIG. 1. This operating environment is only one example of a suitable operating environment, however, and is not intended to suggest any limitation as to the scope of use or functionality of the invention.

Figure 1:
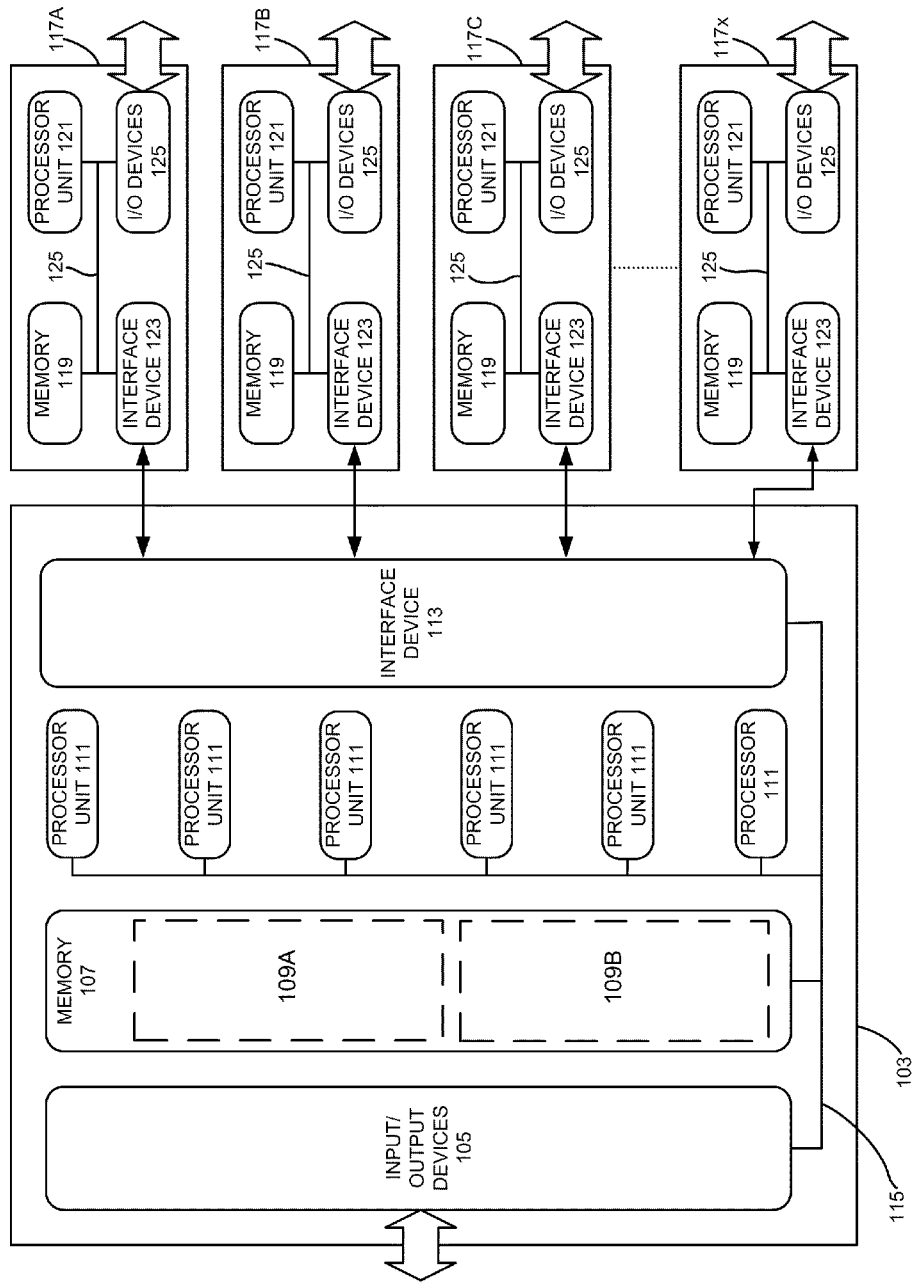
FIGS. 1 and 2 illustrate an example of a computing device that may be employed to implement various examples of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68 K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
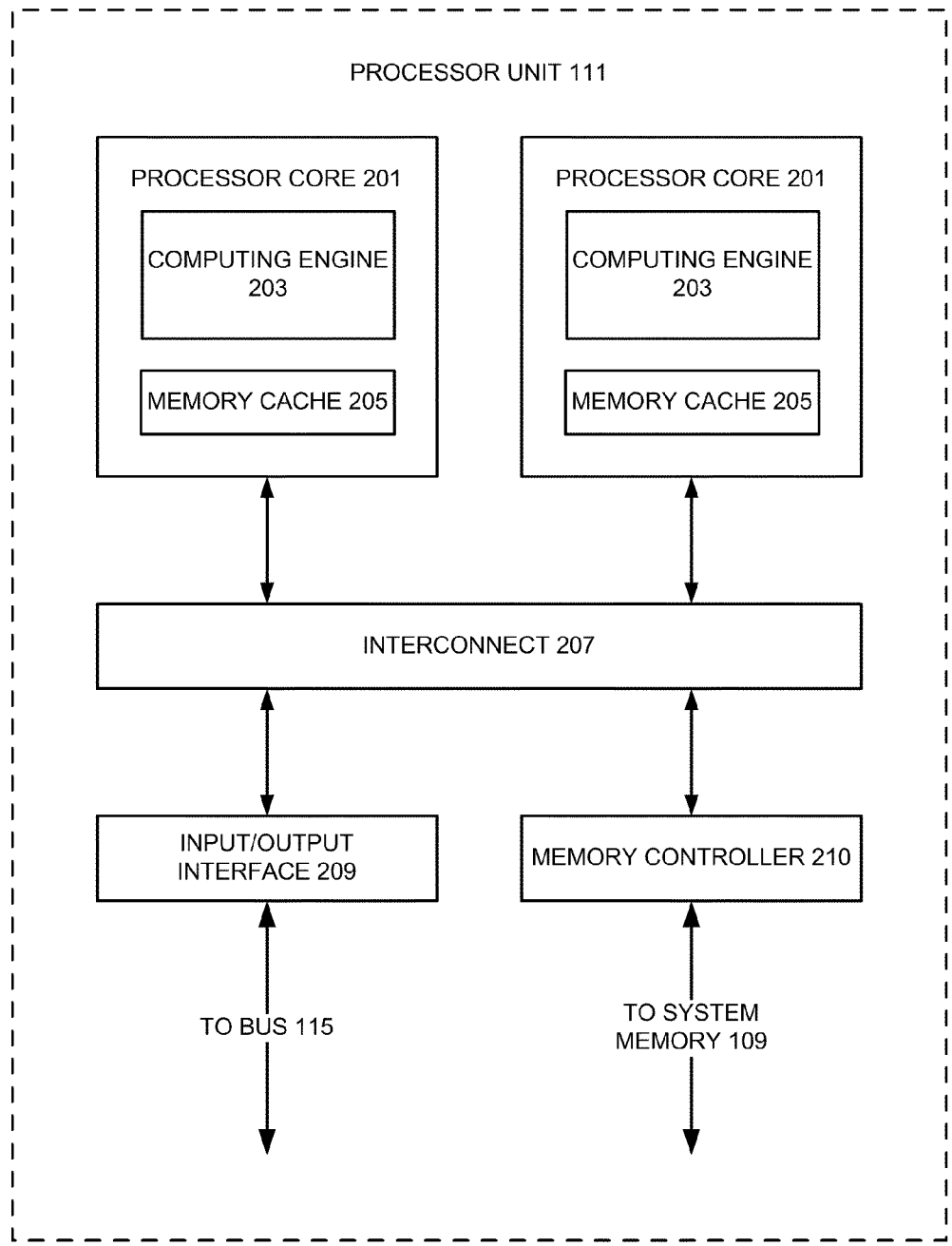

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 128×128 bit registers, four single-precision floating point computational units, four integer computational units, and a 256 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 1157, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 122, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68 K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the invention may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the slave computers 117 may alternately or additions be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Model-Based Lookup Table

As will be discussed in more detail below, various implementations of the invention will employ some type of lithographic manufacturing process model to estimate a thickness of a layer in a microdevice design upon manufacture. More particularly, the model will estimate the thickness of a manufactured design layer from multiple characteristics of the design (such as, for example, the density of geometric elements in the layer and the ratio of the perimeter length of the geometric elements to the area occupied by the geometric elements). Some implementations of the invention, for example, may employ the Virtual Chemical Mechanical Polishing (VCMP) analysis tool available from Taiwan Semiconductor Manufacturing Corporation (TSMC) of Taiwan to estimate the thickness of a manufactured layer. As will be appreciated by those of ordinary skill in the art, the VCMP tool from TSMC can estimate the thickness of a manufactured layer based upon, e.g., the area density of the geometric elements in the layer, the area density after downsizing by a metal stack factor, and the area density after downsizing by a factor based upon the perimeter length of the geometric elements (such that the resulting values correlates to the ratio of the perimeter length of the geometric elements to the area occupied by the geometric elements). Of course, other process models may be alternately or additionally employed by other embodiments of the invention.

With various implementations of the invention, the manufactured layer thickness can be estimated using the process model (or a software tool, such as the VCMP tool from TSMC that employs such a model) on a case-by-case basis, in real-time. Still other implementations of the invention, however, will use the process model or a software tool that employs such a process model to estimate a layer thickness in advance for a wide range of design characteristic combinations, and save that information in a lookup table. For example, some implementations of the invention may use a process model or a software tool that employs such a process model to estimate a layer thickness for each possible combination of geometric element area density (or a value correlating to the geometric element area density) and ratio of the perimeter length of the geometric elements to the area occupied by the geometric elements (or a value correlating to the ratio of the perimeter length of the geometric elements to the area occupied by the geometric elements), and save this information for future use in a lookup table.

Still other implementations of the invention may use a process model or a software tool that employs such a process model to estimate the thickness for only a range of geometric element density/ratio of the perimeter length of the geometric elements to the area occupied by the geometric elements combinations (or correlating values) that might be expected for a manufacturable design. For example, some layout design verification tools may limit the geometric element density of a design portion to a range of 20%-80%. Accordingly, some implementations of the invention may populate the lookup table for geometric element density values falling within this range.

Also, while various implementations of the invention described below employ a process model that estimates a manufactured layer thickness based upon geometric element density and the ratio of the perimeter length of the geometric elements to the area occupied by the geometric elements (or correlating values), still other implementations of the invention may employ any process model that can estimate a manufactured layer thickness based upon two or more characteristics of the design.

Fill Addition Tool

As noted above, various embodiments of the invention may be implemented by the execution of software instructions with a programmable computer. For example, some embodiments of the invention may be implemented using the CALIBRE® verification and manufacturability software tools available from Mentor Graphics® Corporation of Wilsonville, Oreg. It should be appreciated, however, that other software tools for identifying and manipulating structures defined in a circuit layout design are known in the art, and thus may be used to implement various examples of the invention. Further, a user may employ separate software tools in combination to implement various examples of the invention. For example, a user may employ one or more software tools, such as the CALIBRE® verification and manufacturability software tools, to adjust a density of each window in a circuit layout design, and use one or more other software tools, such as proprietary software tools, to calculate the density of each window.

Figure 3:
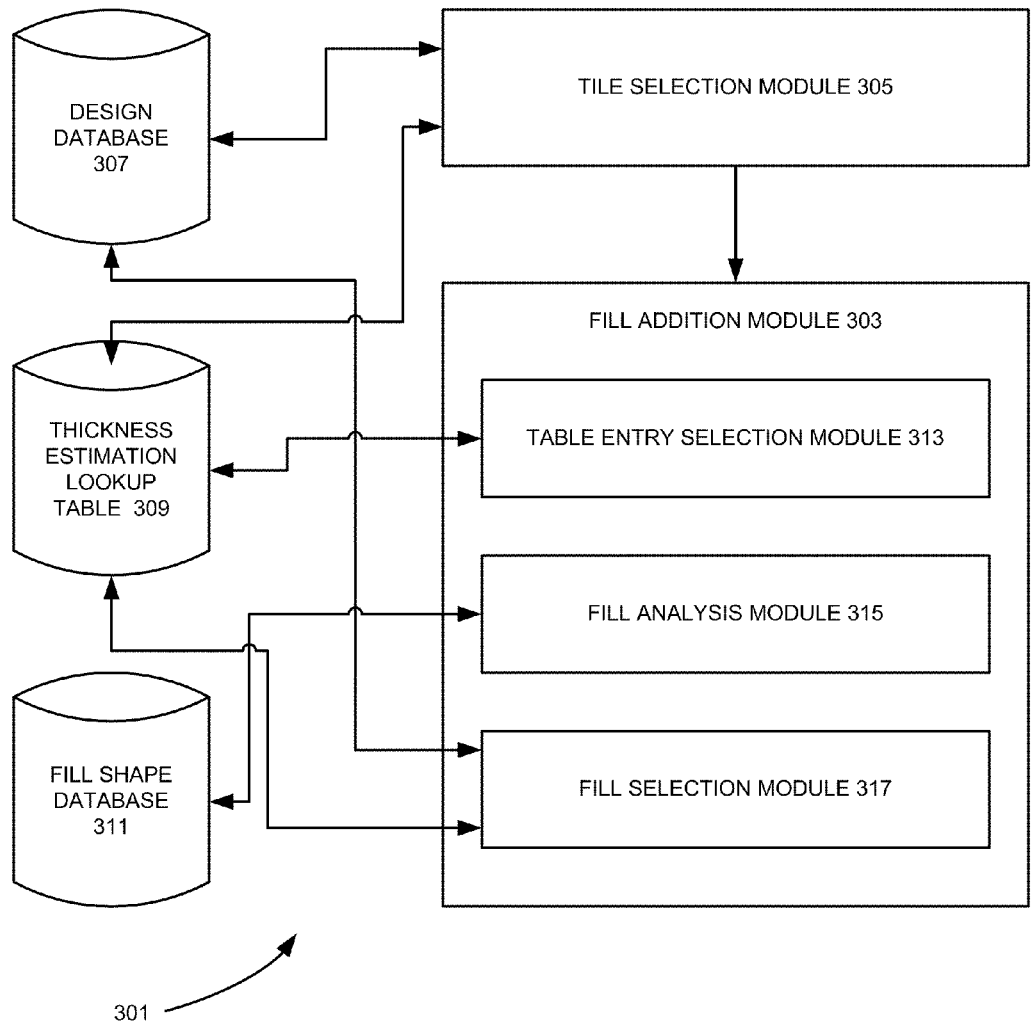
FIG. 3 illustrates an example of a fill addition tool that may be employed according to various embodiments of the invention.

FIG. 3 illustrates an example of a fill addition tool 301 that may be employed according to various examples of the invention to increase the pattern density of material layers described in a circuit design layout. As seen in this figure, the fill addition tool 301 includes a fill addition module 303, a tile selection module 305, a design database 307, a thickness estimation lookup table 309, and a fill shape database 311. The fill addition module 303 includes a table entry selection module 313, a fill analysis module 315, and a fill selection module 317. The operation of each of these components will be discussed in more detail below with regard to the flowchart illustrated in FIG. 4. It should be appreciated, however, that various implementations of the fill addition tool 301 may be employed with fill determination techniques different from the operation shown in the flowchart of FIG. 4. Likewise, it should be appreciated that the fill operation according to various implementations of the invention shown in the flowchart of FIG. 4 may be employed by fill tools other than the fill tool 301 illustrated in FIG. 3.

Figure 4:
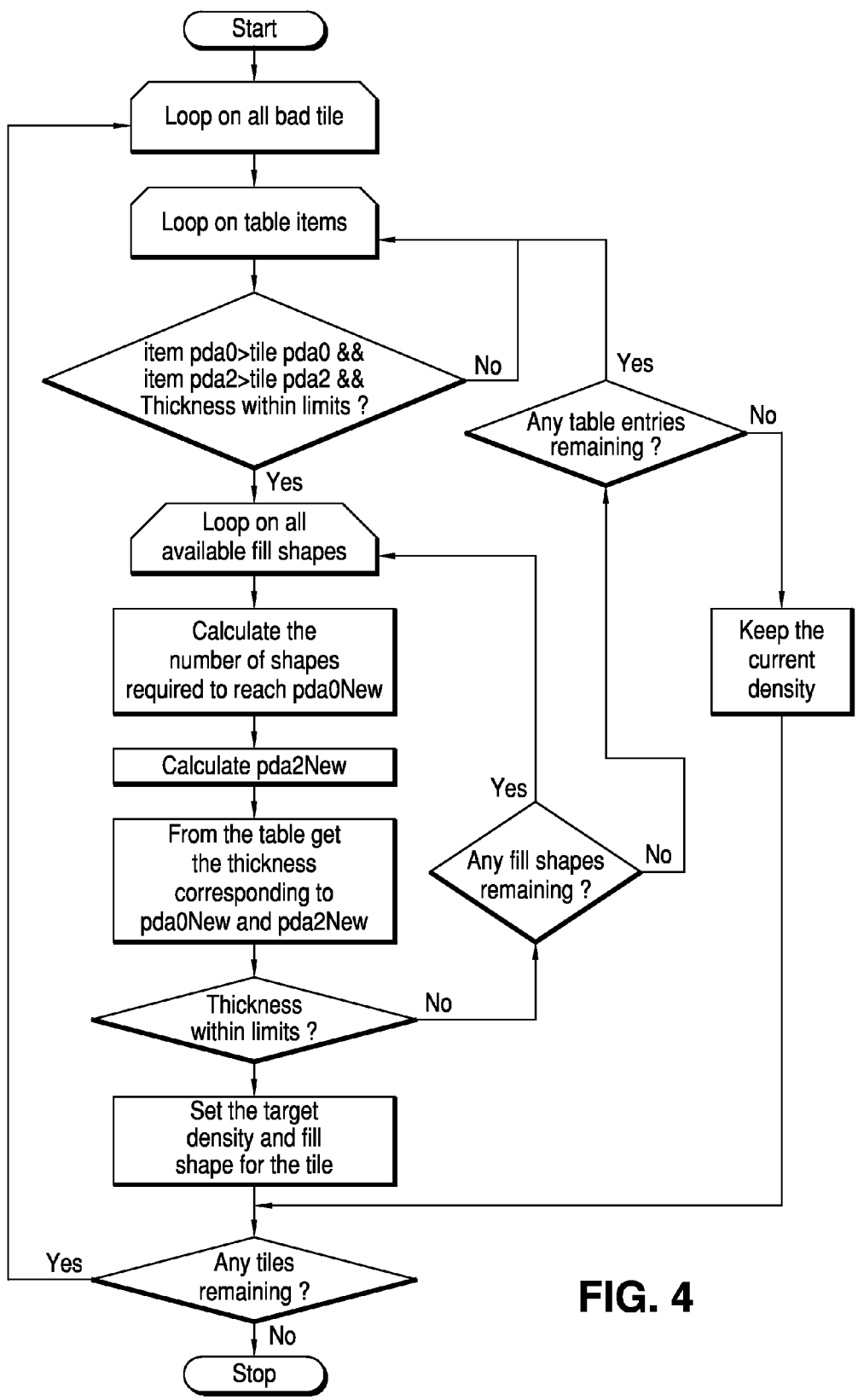
FIG. 4 illustrates a flowchart describing a method of selecting fill geometric elements to be added to an integrated circuit design according to various embodiments of the invention.

Turning now to FIG. 4, an integrated circuit design initially is provided to the fill addition module 303 and the tile selection module 305. With some examples of the invention, circuit design layout data may be provided directly to these modules. Alternately, one or both of these modules may retrieve the circuit design layout data from the design database 307. With various examples of the invention, the circuit design data may be in any desired type of data format, such as GDS-II, Oasis, Open Access, Milkyway, LEF/DEF, or Volcano. The circuit design layout data may describe an entire circuit, or it may describe only a portion of a circuit.

Next, the tile selection module 305 divides a material layer in the circuit design into separate areas, sometimes referred to as "windows" or "tiles." The tile selection module 305 then analyzes each of the windows to identify the tile with the highest functional density. As will be appreciated by those of ordinary skill in the art, this tile inherently determines the largest minimum tile thickness. The tile selection module 305 then selects the estimated thickness of this tile as a base thickness. The tile selection module 305 also determines a target material layer thickness range for the integrated circuit manufactured from the design, by applying an allowable thickness variation to the estimated thickness of the selected tile. The allowable thickness variation may be determined by a designer or manufacturer, or established automatically by a related electronic design automation process (e.g., a design rule check process). This target thickness range thus is established for all of the tiles in the integrated circuit design.

The tile selection module 305 will also analyze each tile, to determine if it has a sufficient pattern density for a thickness estimation model to accurately estimate its expected material thickness upon manufacture. Most conventional thickness estimation models are accurate for only a specific range of pattern densities (e.g., 20% -80%), With some implementations of the invention, if a tile's pattern density is too small for its expected thickness to be accurately estimated, then the tile selection module 305 will simply disqualify that tile from further processing. With still other implementations of the invention, however, the tile selection module 305 may add fill geometric elements to the tile, in order to increase its pattern density up to a level that the thickness estimation model can use to accurately estimate the corresponding material thickness for that tile upon manufacture.

After the tile selection module 305 has determined the target thickness range for the integrated circuit design layer and selected the various tiles to be processed, it analyzes each selected tile to determine if the expected thickness for that tile is within the target thickness range. With some implementations of the invention, this analysis may be performed by employing the thickness estimation model directly (i.e., by plugging the related characteristics of the tile into the model). With still other implementations of the invention, however, the tile selection module 305 can estimate the expected thickness of each tile from a look up table generated using the thickness estimation model. More particularly, various embodiments of the invention may employ the thickness estimation model to generate the thickness estimation lookup table 309, a table of expected thickness values corresponding to combinations of geometric element density values and geometric element perimeter-to-area ratio values (or other values correlating to geometric element density values and/or geometric element perimeter-to-area ratio values) for all possible fill geometric element combinations. If the estimated thickness of a tile is outside of the target thickness range, then the tile selection module 305 selects that tile for further processing, and the tile is provided to the fill addition module 303.

Next, the table entry selection module 313 uses the thickness estimation lookup table 309 to identify a target geometric element density value (or correlating value) and a target geometric element perimeter-to-area ratio value (or correlating value) for the tile that will provide an expected thickness within the target thickness range. More particularly, the table entry selection module 313 will scan the entries of the thickness estimation lookup table 309 until an entry is identified reflecting a geometric element density value greater than the current geometric element density value of the tile, a geometric element perimeter-to-area ratio value greater than the current geometric element perimeter-to-area ratio value of the tile, and an expected thickness within the target thickness range. Of course, alternate implementations of the invention may use the thickness estimation model itself to identify a geometric element density value (or correlating value) and a geometric element perimeter-to-area ratio value (or correlating value) combination for the tile that will provide an expected thickness within the target thickness range.

Once a satisfactory combination of a geometric element density value (or correlating value), a geometric element perimeter-to-area ratio value (or correlating value) and a thickness value has been selected, then the fill analysis module 315 chooses a shape for fill geometric elements from a plurality of fill shape options. Next, fill analysis module 315 determines the amount of geometric elements with the chosen fill shape required to increase the geometric element density value (or correlating value) of the tile to the selected geometric element density value (or correlating value). The fill analysis module 315 also will determine the geometric element perimeter-to-area ratio value (or correlating value) that would result from adding this amount of geometric elements with the chosen fill shape to the tile.

Next, the fill selection module 317 will use these two values with the thickness estimation lookup table 309 to estimate an expected thickness of the tile upon addition of the amount of geometric elements with the chosen fill shape. If the estimated expected thickness of the tile is within the target thickness range, then the fill selection module 317 will add that amount of fill geometric elements with the chosen fill shape to the tile. The fill geometric elements can be added to the integrated circuit design using any conventional fill addition tool, such as the SmartFill tool included in the CALIBRE® family of integrated circuit design verification tools available from Mentor Graphics Corporation of Wilsonville, Oreg.

If, however, the fill selection module 317 determines that the estimated expected thickness of the tile is not within the target thickness range, it will provide the tile back to the fill analysis module 315 for a new fill shape to be selected. The fill analysis module 315 will then select a new fill shape, and determine a new amount of fill geometric elements with the new shape that must be added to the tile in order to provide the tile with the target geometric element density value from the selected thickness estimation lookup table 309 entry. The fill analysis module 315 will then also determine the new geometric element perimeter-to-area ratio value (or correlating value) for this amount of fill geometric elements with the new shape, and these values are provided to the fill selection module 317. This process is repeated until a fill shape is chosen that provides an expected thickness for the tile within the target thickness range.

If the choice of fill shapes is exhausted before a satisfactory expected thickness is obtained, then the fill selection module 317 will provide the tile to the table entry selection module 313 for selection of a new geometric element density value (or correlating value) and geometric element perimeter-to-area ratio value (or correlating value) combination for the tile. These steps are repeated until satisfactory fill geometric elements have been added to the tile, or until all of the appropriate entries in the thickness estimation lookup table 309 have been exhausted. In either case, the fill addition module 303 will move on to process the next tile provided by the tile selection module 305.

Conclusion

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while a specific order of steps has been described above with regard to various examples of the invention, it should be appreciated that alternate embodiments of the invention may perform one or more of these steps in an alternate order, perform one or more of these steps in parallel, or omit one or more of these steps altogether. Also, while various implementations of the invention have been described with respect to the manufacture of integrated circuit devices, aspects of the invention may be employed to manufacture any microdevice, such as micro-electromechanical system devices.

What is claimed is:

1. A method, comprising:
   determining that a portion of an integrated circuit design complies with one or more specified pattern density criterion, and
   upon determining that the portion of the integrated circuit design does not comply with the one or more specified pattern density criterion, then:
   (a) selecting a fill pattern shape from a plurality of fill pattern shapes,
   (b) determining an amount of the selected fill pattern shape to be added to the portion of the integrated circuit design in order for the portion of the integrated circuit design to have a potential pattern density greater than a target pattern density,
   (c) determining a potential pattern perimeter-to-area ratio for the portion of the integrated circuit design if the amount of the selected fill pattern shapes is added to the portion of the integrated circuit design, and
   (d) determining an expected material thickness for the portion of the integrated circuit design based upon the potential pattern density and the potential pattern perimeter-to-area ratio;
   repeating, by a computing device, steps (a) through (d) until a successful fill pattern shape is selected that provides an expected material thickness for the portion of the integrated circuit design that is above a target material thickness; and
   adding, to the portion of the integrated circuit design, the amount of the successful selected fill pattern shape that provides the expected material thickness for the portion of the integrated circuit design that is above the target material thickness.

2. The method recited in claim 1, wherein determining the expected material thickness for the portion of the integrated circuit design based upon the potential pattern density and the potential pattern perimeter-to-area ratio includes employing a look up table.

3. The method recited in claim 1, wherein the one or more specified pattern density criterion includes at least one of:
  an integrated circuit pattern density above a specified pattern density, or
  an integrated circuit pattern perimeter-to-area ratio above a specified pattern perimeter-to-area.

4. The method recited in claim 1, further comprising:
  while repeating steps (a) through (d) until a successful fill pattern shape is selected, determining that any amount of a particular selected fill pattern shape to be added to the portion of the integrated circuit design does not allow for the portion of the integrated circuit design to have a potential pattern density greater than a target pattern density and, in response, repeating steps (a) through (d) with a different selected fill shape.

5. An apparatus, comprising:
  one or more processors;
  memory storing executable instructions configured to, when executed by the one or more processors, cause the apparatus to:
    determine that a portion of an integrated circuit design complies with one or more specified pattern density criterion, and
    upon determining that the portion of the integrated circuit design does not comply with the one or more specified pattern density criterion, then:
      (a) select a fill pattern shape from a plurality of fill pattern shapes,
      (b) determine an amount of the selected fill pattern shape to be added to the portion of the integrated circuit design in order for the portion of the integrated circuit design to have a potential pattern density greater than a target pattern density,
      (c) determine a potential pattern perimeter-to-area ratio for the portion of the integrated circuit design if the amount of the selected fill pattern shapes is added to the portion of the integrated circuit design, and
      (d) determine an expected material thickness for the portion of the integrated circuit design based upon the potential pattern density and the potential pattern perimeter-to-area ratio;
    repeat steps (a) through (d) until a successful fill pattern shape is selected that provides an expected material thickness for the portion of the integrated circuit design that is above a target material thickness; and
    add, to the portion of the integrated circuit design, the amount of the successful selected fill pattern shape that provides the expected material thickness for the portion of the integrated circuit design that is above the target material thickness.

6. The apparatus recited in claim 5, wherein determining the expected material thickness for the portion of the integrated circuit design based upon the potential pattern density and the potential pattern perimeter-to-area ratio includes employing a look up table.

7. The apparatus recited in claim 5, wherein the one or more specified pattern density criteria includes at least one of:
  an integrated circuit pattern density above a specified pattern density, or
  an integrated circuit pattern perimeter-to-area ratio above a specified pattern perimeter-to-area.

8. The apparatus recited in claim 5, wherein the memory further stores executable instructions configured to, when executed by the one or more processors, cause the apparatus to:
  while repeating steps (a) through (d) until a successful fill pattern shape is selected, determine that any amount of a particular selected fill pattern shape to be added to the portion of the integrated circuit design does not allow for the portion of the integrated circuit design to have a potential pattern density greater than a target pattern density and, in response, repeat steps (a) through (d) with a different selected fill shape.

9. One or more computer readable storage devices, storing executable instructions configured to, when executed by one or more processors, cause an apparatus to:
  determine that a portion of an integrated circuit design complies with one or more specified pattern density criterion, and
  upon determining that the portion of the integrated circuit design does not comply with the one or more specified pattern density criterion, then:
    (a) select a fill pattern shape from a plurality of fill pattern shapes,
    (b) determine an amount of the selected fill pattern shape to be added to the portion of the integrated circuit design in order for the portion of the integrated circuit design to have a potential pattern density greater than a target pattern density,
    (c) determine a potential pattern perimeter-to-area ratio for the portion of the integrated circuit design if the amount of the selected fill pattern shapes is added to the portion of the integrated circuit design, and
    (d) determine an expected material thickness for the portion of the integrated circuit design based upon the potential pattern density and the potential pattern perimeter-to-area ratio;
  repeat steps (a) through (d) until a successful fill pattern shape is selected that provides an expected material thickness for the portion of the integrated circuit design that is above a target material thickness; and
  add, to the portion of the integrated circuit design, the amount of the successful selected fill pattern shape that provides the expected material thickness for the portion of the integrated circuit design that is above the target material thickness.

10. The one or more computer readable storage devices recited in claim 9, wherein determining the expected material thickness for the portion of the integrated circuit design based upon the potential pattern density and the potential pattern perimeter-to-area ratio includes employing a look up table.

11. The one or more computer readable storage devices recited in claim 9, wherein the one or more specified pattern density criteria includes at least one of:
  an integrated circuit pattern density above a specified pattern density, or
  an integrated circuit pattern perimeter-to-area ratio above a specified pattern perimeter-to-area.

12. The one or more computer readable storage media devices recited in claim 9, further storing executable instructions configured to, when executed by the one or more processors, cause the apparatus to:
  while repeating steps (a) through (d) until a successful fill pattern shape is selected, determine that any amount of a particular selected fill pattern shape to be added to the portion of the integrated circuit design does not allow for the portion of the integrated circuit design to have a potential pattern density greater than a target pattern density and, in response, repeat steps (a) through (d) with a different selected fill shape.

* * * * *